United States Patent [19]

Drechsel et al.

[11] E Re. 29,458

[45] Reissued Oct. 25, 1977

[54] POTASSIUM PHOSPHATE MANUFACTURE

[75] Inventors: Erhart K. Drechsel, Houston, Tex.; John B. Sardisco; James R. Stewart, Jr., both of Shreveport, La.

[73] Assignee: Pennzoil Company, Shreveport, La.

[21] Appl. No.: 597,180

[22] Filed: July 18, 1975

Related U.S. Patent Documents

Reissue of:

[64] Patent No.: 3,697,246
Issued: Oct. 10, 1972
Appl. No.: 81,280
Filed: Oct. 16, 1970

[51] Int. Cl.[2] ..... C05B 7/00

[52] U.S. Cl. ..... 71/34; 71/40; 71/51; 71/53; 71/63; 423/309; 423/313

[58] Field of Search ..... 71/34, 37, 40, 41, 51, 71/63; 423/307-313

[56] References Cited

U.S. PATENT DOCUMENTS

| | | | |
|---|---|---|---|
| 1,929,443 | 10/1933 | Miligan | 23/107 |
| 2,945,275 | 9/1960 | Carothers et al. | 71/40 |
| 3,241,944 | 3/1966 | Takeda et al. | 71/40 |
| 3,547,615 | 12/1970 | Beckman | 71/34 |
| 3,718,453 | 2/1973 | Thompson | 71/37 X |
| 3,803,884 | 4/1974 | Thompson | 71/37 X |

*Primary Examiner*—Frank A. Spear, Jr.
*Assistant Examiner*—Ferris H. Lander
*Attorney, Agent, or Firm*—Lowe, King, Price & Markva

[57] ABSTRACT

Fertilizer materials, especially potassium dihydrogen phosphate, are produced by the reaction of phosphate rock or a solubilized form thereof, such as mono calcium phosphate, dicalcium phosphate, etc., concentrated sulfuric acid, potassium hydrogen sulfate and, optionally fresh or recycle phosphoric acid, the resulting mixture is filtered to remove the calcium sulfate precipitate and the potassium dihydrogen phosphate is recovered from the filtrate, either by concentration and filtration or by extraction with an organic solvent.

11 Claims, 1 Drawing Figure

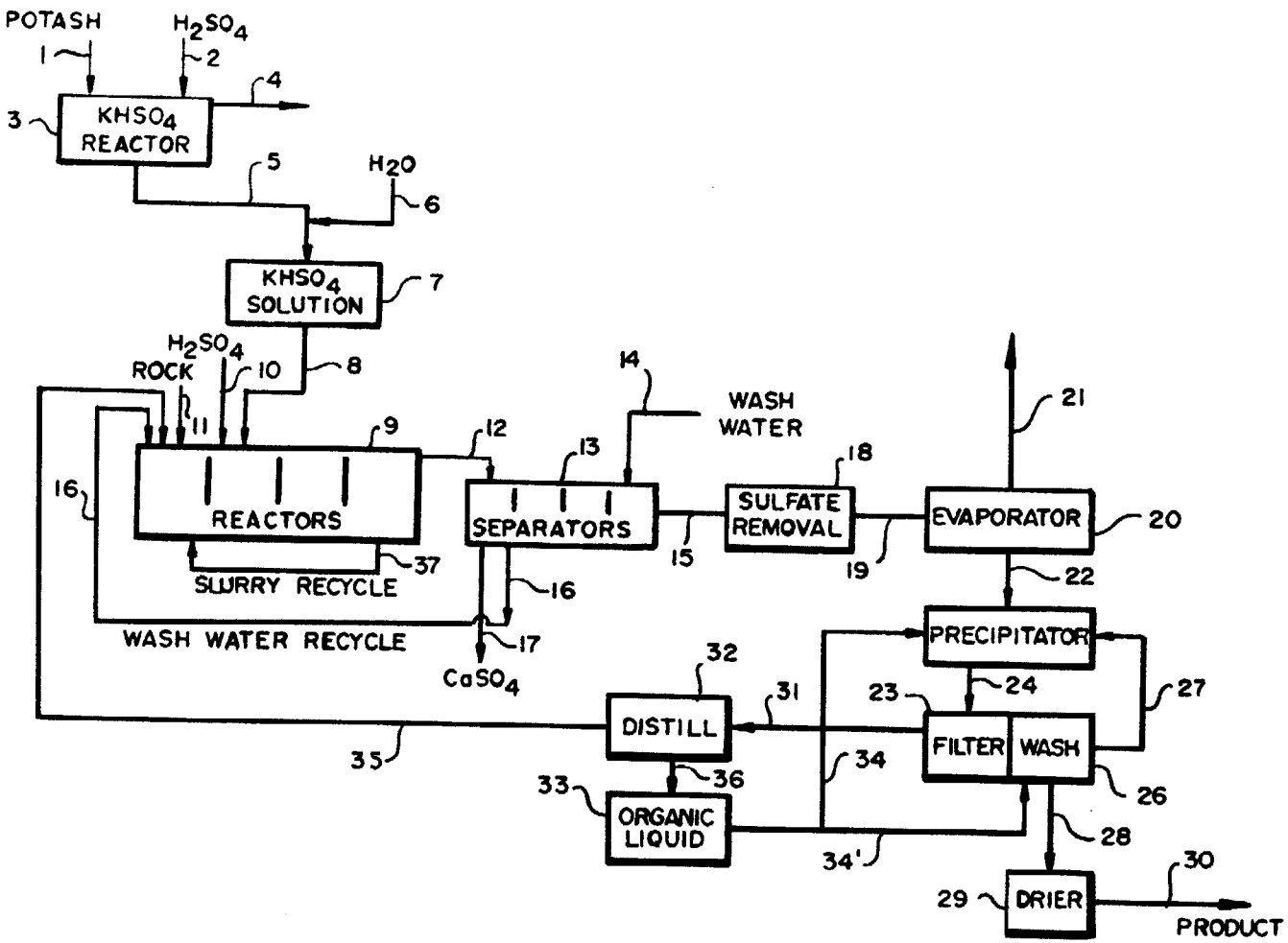
POTASH
1
3
KHSO4 REACTOR
H2SO4
2
4
5
H2O
6
KHSO4 SOLUTION
7
8
H2SO4
10
ROCK
11
9
REACTORS
37
SLURRY RECYCLE
WASH WATER RECYCLE
12
16
13
SEPARATORS
14
WASH WATER
15
16
17
CaSO4
SULFATE REMOVAL
18
19
EVAPORATOR
20
21
22
PRECIPITATOR
24
27
FILTER
WASH
23
26
28
DRIER
29
30
PRODUCT
34
34'
31
DISTILL
32
36
ORGANIC LIQUID
33
35

POTASSIUM PHOSPHATE MANUFACTURE

Matter enclosed in heavy brackets [ ] appears in the original patent but forms no part of this reissue specification; matter printed in italics indicates the additions made by reissue.

CROSS-REFERENCES TO RELATED APPLICATION

This application is related to application Ser. No. 755,699, filed Aug. 27, 1968 and now U.S. Pat. No. 3,600,152.

BACKGROUND OF THE INVENTION

Field of the Invention

This invention relates to a process for the production of potassium dihydrogen phosphate from phosphate rock or a solubilized form, sulfuric acid and potassium hydrogen sulfate wherein the reaction may be carried out in either a batch or a continuous manner.

Description of the Prior Art

In our application above-identified, there are disclosed and claimed potassium polyphosphate products, processes for preparation of mixtures of potassium dihydrogen phosphate and potassium monohydrogen phosphate and the treatment of these mixtures by heating at an elevated temperature to produce a novel reaction product mixture having variable water solubility and variable molecular weight, which mixture is eminently suitable as a fertilizer material. In our prior application, there are also disclosed procedures for the preparation of these mixtures which generally comprise reaction of an acid such as phosphoric acid and/or sulfuric acid or mixtures thereof with phosphate rock or a solubilized form in the presence of potassium sulfate or potassium hydrogen sulfate at temperatures in the range of about 40° to 90° C. The present invention provides an improved and refined process for the preparation of the desired potassium dihydrogen phosphate and the potassium monohydrogen phosphate in a purity suitable for use as a fertilizer or for further conversion to potassium polyphosphate products.

Various processes are known in the prior art for the reaction of phosphate rock or solubilized forms and an acid such as sulfuric acid or phosphoric acid or mixtures thereof, processes of these types being generally referred to as phosphate rock acidulation. Quite often potassium sulfate, and in some cases, potassium hydrogen sulfate, may be added to precipitate the calcium present in the mixture as calcium sulfate. These patents are for example, U.S. 1,866,657, 2,046,829, 1,747,588, 744,128, 1,037,837, 1,447,544, 2,046,841, 2,046,842 and 1,961,127.

The processes in these patents do not, however, provide a sufficiently pure product for commercial use. Moreover this prior art does not disclose a procedure by which potassium dihydrogen phosphate can be easily recovered. The process of the present invention overcomes these disadvantages.

SUMMARY OF THE INVENTION

It is accordingly one object of this invention to provide procedures for the preparation of potassium dihydrogen phosphate in good yields and high purities.

A further object of this invention is to provide a procedure whereby this material is prepared by the reaction of phosphate rock or a solubilized form thereof, sulfuric acid and optionally phosphoric acid, and potassium hydrogen sulfate by a batch or continuous procedure.

Other objects and advantages of the present invention will become apparent as the description thereof proceeds.

In satisfaction of the foregoing objects and advantages, there is provided by this invention a process for the preparation of potassium dihydrogen phosphate which comprises reacting phosphate rock, or a solubilized form thereof such as monocalcium phosphate or dicalcium phosphate, sulfuric acid, optionally, fresh or recycle phosphoric acid and preferably the phosphoric acid formed in the reaction, and potassium hydrogen sulfate, at a temperature of about 40°-90° C.

BRIEF DESCRIPTION OF THE DRAWING

Reference is now made to the drawing accompanying the application which sets forth a schematic outline of a continuous process for practicing the process of the invention.

DESCRIPTION OF THE PREFERRED EMBODIMENTS

As indicated above, the process of this invention is concerned with the preparation of potassium dihydrogen phosphate by the reaction of phosphate rock or a solubilized form thereof, sulfuric acid, optionally phosphoric acid, and potassium hydrogen sulfate. When using phosphate rock per se, which is preferred for purposes of economics, this reaction may be generally described by the following equation:

$$\text{Phosphate rock} + KHSO_4 + H_2SO_4 + H_3PO_4 \rightarrow KH_2PO_4 + CaSO_4$$

Obviously, in this equation, different molar ratios of products are produced using different molar amounts of starting materials. The final product, potassium dihydrogen phosphate is of course eminently useful as a fertilizer since it provides both potassium and phosphorus nutrients in solid form for the soil.

The phosphate rock feed employed in the process may be phosphate rock per se of any desired mesh or size but is preferably about 200 mesh. Any solubilized form of phosphate rock may be used however such as monocalcium phosphate, dicalcium phosphate and tricalcium phosphate. All of these materials are well known in the art. Procedures for their formation from phosphate rock are also well known.

The sulfuric acid employed in conducting the reaction is preferably commercial concentrated sulfuric acid (about 97% concentration) but it is also feasible to employ aqueous sulfuric acid having a concentration of about 60-98%. Commercial concentrated sulfuric acid is preferred however because of its ready availability. The sulfuric acid is generally utilized in an excess of about 3 to 10 weight percent which as the effect of forming phosphoric acid in situ by reaction with the phosphate rock. A portion of the excess sulfuric acid may be replaced by a different mineral acid to provide hydrogen ions.

Any source of potassium hydrogen sulfate reactant can be employed. This material is preferably added as an aqueous solution of about 10-50% strength. It is highly preferable however to employ as a source of potassium hydrogen sulfate ($KHSO_4$) the reaction product of potash (KCl) and sulfuric acid as the $KHSO_4$ resulting from this reaction has been found to be eminently suitable for use in the invention as it contains very low quantities of chloride. The reaction between the potassium chloride and sulfuric acid in formation of the $KHSO_4$ is generally conducted at a temperature from 250° to 300° C. and the dry HCl evolved may be processed as desired such as recovery and use in the conversion of phosphate rock to a solubilized form. The resulting $KHSO_4$ product is then preferably dissolved in water or one of the dilute recycle streams to the desired concentration suitable for use in the process.

As indicated above, an optional reactant for use in the process is phosphoric acid. In a batch process this would ordinarily be the phosphoric acid formed in the reaction. However in the preferred continuous process, recycle phosphoric acid is used, to which may be added fresh concentrated phosphoric acid if desired. Obviously $H_3PO_4$ is formed in the reaction between the rock or solubilized form and the sulfuric acid and this is recycled in the continuous process.

The reaction is conducted at an elevated temperature, preferably a temperature of about 40°-90° C. with a highly preferred temperature range being 55°-70° C. To this extent the temperature range is critical as conversions may suffer outside the indicated ranges. The residence or hold-up time in the continuous process is variable but may range from about 2 to 12 hours and preferably is about 6 hours for optimum results.

In practicing this reaction according to the present invention a number of critical criteria are observed in order to obtain optimum results. Thus, in the process, the phosphate rock or solubilized form thereof, is contacted with recycle streams at an elevated temperature and the potassium hydrogen sulfate and sulfuric acid are added thereto. In a preferred manner of operation an agitated solution of the phosphate rock and the recycle solution is maintained at a temperature of about 40°-90° C. and an aqueous 10 to 50% solution of the potassium hydrogen sulfate and sulfuric acid, preferably about 4% $H_2SO_4$ and 42% $KHSO_4$ solution, is added slowly, i.e., portionwise or dropwise, over a predetermined period of time. The slow addition of the potassium hydrogen sulfate and acid aids the process in minimizing formation of the insoluble double salts $KHSO_4 \cdot CaSO_4$ and/or $5KHSO_4 \cdot CaSO_4$, as these double salts inhibit complete formation of the desired products and the potassium in this double salt is difficult to recover from the by-product cake. Accordingly, the slow addition of the potassium hydrogen sulfate in solution form to the other reactants represents an important aspect of the present invention.

In the reaction, it is also desirable that the concentration of dissolved solids not exceed about 60% and preferably lie in a range of 10-40%, as a higher concentration of dissolved solids, which is often found in phosphoric acid plants, is not optimum because of the differences in solubilities of the salts present. Therefore, a maximum of about 40% by weight of the dissolved solids is desirable in conducting the reaction.

As pointed out above, phosphate rock per se may be employed as the main reactant mineral in the process. However, solubilized mineral forms of the rock, including monocalcium phosphate, dicalcium phosphate, tricalcium phosphate, etc. may also be employed and these are especially desirable in some cases. It is well known, of course, that these solubilized forms may be prepared from the phosphate rock per se and from less solubilized forms. In one convenient procedure for effecting conversion to a more solubilized form, there may be used aqueous hydrochloric acid with the phosphate starting material to produce a reaction mixture containing phosphoric acid, a calcium phosphate and calcium chloride. Reaction of this mixture with additional quantities of the starting phosphate then will precipitate dicalcium phosphate and thereafter, by adding limestone or lime, a suspension containing insoluble dicalcium phosphate and unreacted starting phosphate material can be obtained in a solution of calcium chloride. The solids may be separated and washed until the chloride is removed and thereafter employed in the process of the invention. To improve the economics of this process, the aqueous hydrochloric acid employed may be that obtained as a result of the formation of the $KHSO_4$ by the reaction of KCl and $H_2SO_4$.

In conducting the primary reaction of this invention, the phosphate rock or corresponding starting material is contacted with the sulfuric acid and the potassium hydrogen sulfate slowly added thereto. Reaction of the phosphate starting material and sulfuric acid forms phosphoric acid in situ and additional phosphoric acid recovered subsequently in the process may be recycled back into the attack tank. From this reaction there is formed ions of the desired potassium dihydrogen phosphate contained in phosphoric acid solution with a crystalline calcium sulfate precipitate. Generally, the crystalline calcium sulfate precipitate is eliminated from the mixture by filtration and thereafter the potassium dihydrogen phosphate is recovered from the mother liquor.

After removal of the calcium sulfate by filtration, it is then preferable to separate the potassium dihydrogen phosphate from the phosphoric acid solution and it has been found that a convenient procedure for effecting this separation is by extraction thereof with an organic solvent.

Typical organic solvents which may be used include those which are miscible with water such as the lower alkyl alcohols including methyl alcohol, ethyl alcohol, isopropanol, etc. as well as lower alkyl ketones such as acetone. Treatment of the phosphoric acid solution with the organic solvent provides a means whereby the potassium dihydrogen phosphate is caused to precipitate by addition of the organic solvent with the phosphoric acid ions remaining in the solution. The organic solvent also extracts some of the impurities present in the solution. Thus addition of the organic solvent to the acid solution causes the potassium dihydrogen phosphate, along with any potassium sulfate present, to precipitate and it may thereafter be recovered, preferably after washing and subsequent filtration to produce crystals which are thereafter dried. The mother liquor containing the water, phosphoric acid, residual potassium phosphate, $K_2SO_4$ and organic solvent from the precipitation step may then be distilled for recovery of the organic solvent and the phosphoric acid and potassium phosphate and $K_2SO_4$ separated therefrom may be recycled to the attack tank in a continuous process.

In an alternative embodiment, rather than use an organic solvent extractant, the suspension of product in the phosphoric acid may be processed by separation of the calcium sulfate, washing the filter cake with water, and a mother liquor containing the phosphoric acid, potassium sulfate and potassium dihydrogen phosphate is concentrated and cooled to crystallize the $KH_2PO_4$ and $K_2SO_4$ which is then filtered, washed and dried. The $H_3PO_4$ mixture is then recycled to the attack tank which contains the starting material, and additional $KHSO_4$ and sulfuric acid.

It is pointed out with regard to the use of phosphate rock per se in the reaction, that there must be present an excess of sulfuric acid or replaced in part by other mineral acids (e.g. $HNO_3$, $H_3PO_4$, etc.) in order to provide the additional hydrogen ions necessary to drive the reaction to completion and provide excess sulfate ion to form filterable gypsum crystals. Because of the presence of the excess sulfate ion, the final product will usually contain about 2.0 up to 5.0 weight percent of $SO_4^=$. Depending on the purity of the final product desired, it is sometimes desired and/or required that the sulfate ion content be lowered and the present invention provides some alternative or optional procedures by which the sulfate ion content can be lowered.

After completion of the reaction, a slurry is obtained which contains the desired potassium phosphate compounds in solution with the calcium sulfate salt precipitate. This mixture is then separated as described at about the reaction temperature of the system to provide the resulting solid or filter cake of insoluble calcium sulfate and a filtrate. The filtrate resulting from the filtration step prior to precipitation of the $KH_2PO_4$, contains the desired potassium phosphate ions in acidic aqueous solution, the filtrate having a pH of about 1.4 to 1.7. This filtrate contains $H_3PO_4$, $HSO_4^-$, $H_2PO_4^-$, $H^+$, $Ca^{++}$, $K^+$ and $SO_4^=$ ions with traces of Fe, Al and Si ions and with the $HSO_4^-$ and $SO_4^=$ content being of about 2.0 to 5.0 weight percent. By neutralization of this filtrate with, e.g. CaO, the potassium monohydrogen phosphate is formed. The formation of this material has been found to be a function of the pH of the mixture and by this procedure the amount of $K_2HPO_4$ and $KH_2PO_4$ to be obtained from the filtrate can be regulated and predicted in accordance with the teachings of our parent application.

As mentioned above, it is sometimes desired that a substantial amount of the sulfate ion be removed as it decreases the purity of the final product for use [is] *in* some areas. The sulfate ion is present of course because of the requirement that during acidulation, excess sulfate is required. Thus it is often desirable to minimize the amount of $SO_4^=$ and partially neutralize the filtrate product without precipitating an excess amount of $PO_4^{\equiv}$ and $K^+$ as the potassium sulfate-calcium sulfate double salt.

A number of optional and alternative procedures are presented by this invention for removal of the excess sulfate ion and partial neutralization of the product. According to this invention, treatment of the filtrate by the addition of a calcium bearing material such as fresh phosphate rock, calcium oxide, tricalcium phosphate, dicalcium phosphate or calcium phosphate alternatively or successively, has been found sufficient to remove a substantial quantity of the sulfate ion. Also, continuous countercurrent processing improves sulfate ion removal efficiency.

The treatment of the excess sulfate with the phosphate rock or other source of calcium ion such as CaO is carried out at a temperature of about 40° to 90° C. with separation of the resulting solids as by filtration also conducted at about 40° to 90° C. It has been found that a single treatment of these reagents is sufficient to remove at least about 50% of the sulfate ion present and is also sufficient to increase the pH of the solution. The ability to remove excess sulfate ion was determined by the addition of each of these materials in single pass batch reactors with a residence time of about six hours at a temperature of about 60° to 80° C. From these determinations the following criteria were arrived at for sulfate ion removal.

It was found that at levels greater than about 4 weight percent and preferably about 4 to 10 weight percent, based on the weight of the filtrate, of tricalcium phosphate and/or dicalcium phosphate, about 70 to 75 weight percent of the $SO_4^=$ was removed. Under the same conditions about 12 to 16 weight percent of monocalcium phosphate was required to reduce the $SO_4^=$ content 70–75 weight percent. Similarly at levels greater than about 2 weight percent of phosphate rock and preferably of about 2 to 6 weight percent, based on the weight of the filtrate, 50 to 55 weight percent of the $SO_4^=$ was removed. Therefore, use of any of these materials in the amounts indicated serves to substantially reduce the sulfate ion content.

During these determinations, it was noted that the amount of $K^+$ and $PO_4^{\equiv}$ precipitated from the filtrate varied in a complicated manner with the amount of each reagent added. Also, the highest pH for the solution that could be obtained using the phosphate rock, tricalcium phosphate, dicalcium phosphate and monocalcium phosphate was about 2.2, 3.0, 2.5 and 1.75, respectively. Thus, while these reagents can be used to substantially reduce the $SO_4^=$ in the filtrate, they are not sufficient to neutralize to a high pH value which is desirable.

It was discovered however that by treating the filtrate substantially calcium oxide (CaO) under the same conditions in amounts up to phosphate 2 weight percent, the weight percent of the $SO_4^=$ in the filtrate decreased about 75 weight percent. At this point the pH of the filtrate was about 2.6. As the CaO was further increased however, the pH increased and the amount of $SO_4^=$ remaining in solution increased due to the preferential precipitation of basic calcium phosphates at high pH values leaving the $SO_4^=$ in solution. For example, at 10 grams of CaO per 100 grams of filtrate, the pH of the resulting mixture was 6.4, about 98 weight percent of the $SO_4^=$ remained in solution and about 75 weight percent of the $PO_4^{\equiv}$ was removed. Thus, the CaO can be used to neutralize as well as to remove $SO_4^=$ from the filtrate but the amount added in each successive treatment is critical. Also, the weight ratio of $K^+/PO_4^{\equiv}$ in the filtrate can be controlled by the amount of CaO added. As pointed out above, neutralization of the filtrate with CaO or other base is also a convenient procedure for formation of the desired amount of $K_2HPO_4$.

Treatment of the filtrate or product solution with fresh phosphate rock also provides an advantageous procedure, particularly in a continuous operation as it provides a means of lowering the sulfate ion content of the solution to a satisfactory level by allowing the sulfate to react with the calcium content of the rock and the rock residue can be recovered and recycled to the main reaction system. To improve the efficiency of this rock treatment step and make the solution more receptive to sulfate ion removal, additional hydrogen ion such as derived from a mineral acid, e.g. nitric acid, phosphoric acid, etc. can be added. Therefore, use of fresh rock with the subsequent addition of calcium oxide is particularly beneficial in the system.

It is also feasible, and sometimes desired, to neutralize the excess sulfate ion with a material which would add additional fertilizer nutrients to the solution. Hence, neutralization of the sulfate ion with ammonia will form ammonium sulfate valuable fertilizer ingredient, which would yield an N-P-K fertilizer. Further, the mixture or a portion thereof can be neutralized with other materials such as magnesium oxide, or salts of zinc, copper, iron, etc. or any other material useful to provide valuable minor micronutrients to the soil.

After treatment with any of these materials, the solids are removed and preferably cycled to the attack tank. The resulting solution is combined with any other filtrates present and processed as described to provide the products.

As pointed out above, the process of this invention is eminently suitable for use in a continuous operation and in the drawing accompanying this invention, there is provided such a continuous procedure which provides a workable and economically feasible continuous system for practicing the process of the invention. In the drawing, it will be seen that a schematic outline of a continuous process encompassing a preferred procedure for conducting the reaction is illustrated. It is to be understood that the various stirrers, pumps, fuel sources, etc. used in conducting the process, are to be included in the operation as they are obvious to one skilled in the art.

Referring now to the drawing where one embodiment of the invention is illustrated, it will be seen initially that $KHSO_4$ is formed by the addition of potash and sulfuric acid through lines 1 and 2 to reactor 3 maintained at a temperature of about 250° to 300° C. wherein the two materials interact to form potassium hydrogen sulfate for use in this reaction. The dry hydrogen chloride formed is removed by line 4 from the reactor for disposal or use as desired, e.g. in conversion of phosphate rock to a solubilized form.

The resulting potassium hydrogen sulfate is passed through line 5, after mixing with water from line 6, to tank 7 to form an aqueous solution of about 10–50% by weight of $KHSO_4$. This aqueous solution is then fed through line 8 at a controlled rate into the reactor 9, which may of course be a series of reactors with slurry recycle. The reactors are maintained at a temperature of about 40°-90° C. and provided with means for agitation.

Concentrated sulfuric acid is introduced into reactor(s) 9 through line 10, while simultaneously, fresh phosphate rock, or one of the solubilized forms, is introduced through line 11 for reaction with the sulfuric acid and $KHSO_4$.

In the reactor 9 the reactants are intimately contacted at the temperature of about 40°-90° C. In the continuous system using a series of reactors, a slurry of the reacting mixture is generally continuously recycled from the last reactors to the first or intermediate reactors via line 37 to obtain complete reaction.

The reacting slurry is then removed from the reactors by line 12 and passed to filter 13, or analogous separator such as a centrifuge where the calcium sulfate crystals are filtered off and removed through line 17. The filter cake is continuously washed with wash water introduced through line 14 and the wash water is recycled to the reactor 9 through line 16 for contact with the reacting slurry.

The filtrate removed from filter 13 by line 15 is usually too high in sulfate ion content if rock is employed as the feedstock as discussed above and is further processed by any of the several described procedures to lower the sulfate ion content to a level desired in the final product. The sulfate removal treatment steps are generally designated as 18 in the drawing but the specific procedures are not further illustrated.

In one embodiment, the filtrate is passed to a treatment tank where it is treated with fresh phosphate rock at a temperature of about 40°-90° C. with agitation of the mixture. If desired, a source of hydrogen ions such as from phosphoric acid, nitric acid, etc. can be added to the mixture or these materials can be added with the rock. After contact with the phosphate rock the mixture is separated and the solids are recycled to the reactor for acidulation of the rock remaining in the mixture and disposal of the additional $CaSO_4$ formed. Also monocalcium or dicalcium phosphate can be used in place of phosphate rock to precipitate $CaSO_4$.

Other highly efficient procedures for lowering the sulfate ion content of the filtrate involve a countercurrent extraction system with phosphate rock and filtrate as feeds, or a co-current system with small amounts of fresh rock added to each successive stage in the filtrate system.

In the preferred aspect the filtrate from the rock treatment step is passed to a second sulfate removal system at a temperature of about 40°-90° C. where calcium oxide is introduced in the required amount to decrease the sulfate ion content while also partially neutralizing the mixture. If desired there may also be added other reagents which will further neutralize the mixture or provide traces of micronutrients needed by the soil. For example ammonia or one of the trace metals or salts thereof may be added to the mixture at this point. This mixture is then passed to a separator from which any solids are recycled back to main reactor 9 for further treatment and conversion. This filtrate, now low in sulfate ion, is then removed and passed to the evaporator for product recovery as described below.

The resulting product solution after the sulfate removal steps, is then transferred via line 19 to an evaporator 20 where volatiles are removed to the atmosphere and the solution is concentrated to a solution of about 30–60 wt. percent (preferably 40%) by line 21 followed by transfer of the concentrated solution by line 22 to a precipitator 23 to which is added an organic liquid for precipitation of the product by line 34. The organic liquid/product mixture is then sent to a filter and wash station 25 and 26 via line 24 where the product is removed by filtration followed by an organic liquid wash via line 34'. The wash liquid is recycled by line 27 to the precipitator 23. The resulting mother liquor is removed from the filter/wash station by line 31 and distilled at 32 to recover the organic solvent and return it to storage vessel 33 via line 36. The remaining bottoms are recycled to the main reactor by line 35. The product crystals are taken from wash station 26 by line 28, dried in drier 29, and the final product recovered through line 30.

Quite obviously, this process may be varied in many respects. For example, there may be included in this process the procedure for conversion of the phosphate rock to one of its solubilized forms by the reaction with hydrochloric acid as described hereinabove. In addition, if it is desired not to employ the organic solvent treatment step, working up of the final product may merely comprise concentration and crystallization of the filtrate solution in a crystallizer followed by a separation as in a filter and washing and drying the final product with recycle of the mother liquor which is primarily phosphoric acid.

The following examples are presented to illustrate the process of the invention but are not to be considered as limitative thereon.

In the examples, the system set forth on the drawing accompanying this application was employed in practicing the process in a continuous manner. In the examples, separate runs were made with two and three reactors in series employed in order to show these embodiments. In these initial experiments, however, the resulting filtrates were not subject to treatment to lower the sulfate ion content.

In the reaction sufficient excess phosphate rock and sulfuric acid were used to provide 3 moles of $H_3PO_4$ in the reaction. In these runs, both the slurry and circulated filter wash water were recycled except where noted.

The results of the experiments are set forth in the following Table I, which table states the feed rates of starting materials, reaction conditions and analyses of the products obtained.

From the data given in Table I, it will be seen that $PO_4^{=}$ conversions for these runs are consistently at 90% and above thus demonstrating the efficiency of the reaction. It will also be noted however that $SO_4^{=}$ content in the filtrate is rather high, a factor attributable to the size of the run. This would not be expected to be significant in a larger scale run.

In these runs the product was recovered by concentration of the resulting filtrate to a weight percent of product of about 40%. Thereafter the product was precipitated by the addition of an equal volume of organic solvent. In Examples I–V the organic solvent was methyl alcohol whereas in Examples VI–XI, the precipitation solvent was acetone. As will be observed, product recovery was excellent in all runs.

As discussed hereinabove, the product filtrate from the continuous reactor is acidic (pH about 1.4) and contains about 3.5–5.0 weight percent of $SO_4^{=}$. Thus when producing the polyphosphates it is preferable to minimize the amount of $SO_4^{=}$ in the product and also partially neutralize the filtrate product. Both of these aims can be partially accomplished by treating the filtrate with fresh phosphate rock, monocalcium or dicalcium phosphate, calcium oxide or a combination thereof or any of the other materials discussed above. The following examples illustrate the reaction using phosphate rock and calcium oxide for this purpose.

To illustrate this, successive batch runs were conducted using a synthetic filtrate of known $SO_4^{=}$ content phoshate rock and calcium oxide in the amounts set forth in Table II below. These batch runs were carried out at a temperature of about 60° C. with a residence time of six hours with agitation of the reactor. After the run was completed the slurry was filtered and the filtrate used for the next successive treatment. Thus, these filtrates are labeled as Filtrates A', A'' and A'''.

It wll be noted from the results of Table II below that a final product (filtrate) solution is obtained which has a pH of 3.5 to 3.8, a weight ratio of $SO_4^{=}$/total

TABLE I

| Example Number | Rock feed rate, qm/min. | Rock[1] used | Wt. $KH_3SO_4$/ wt. rock | Wt. $KHSO_4$/ wt.rock | Initial H ion content, wt. $H^+$/ wt. rock | Moles $SO_4$/ moles Ca | Reactor temperature (° C.) I | II | III |
|---|---|---|---|---|---|---|---|---|---|
| I | 10.18 | A | 0.441 | 0.703 | 0.0143 | 1.124 | 33 | 77 | 80 |
| II | 10.18 | A | 0.442 | 0.720 | 0.0145 | 1.084 | 32 | 73 | 79 |
| III | 10.18 | A | 0.442 | | 0.0146 | 1.155 | 33 | 58 | 58 |
| IV | 10.18 | A | 0.456 | 0.631 | 0.0139 | 1.073 | 33 | 90 | 90 |
| V | 10.18 | B | 0.426 | 0.688 | 0.0137 | 1.078 | 80 | 80 | 80 |
| VI[2] | 10.18 | B | 0.428 | 0.725 | 0.0139 | 1.099 | 78 | 80 | 80 |
| VII | 10.18 | B | 0.396 | 0.713 | 0.0131 | 1.046 | 62 | 63 | 64 |
| VIII | 10.18 | B | 0.346 | 0.690 | 0.0119 | 0.969 | 64 | 67 | 67 |
| IX[3] | 10.18 | B | 0.503 | 0.846 | 0.0163 | 1.288 | 60 | 77 | 83 |
| X | 10.18 | C | 0.373 | 0.600 | 0.0128 | 1.071 | 60 | 60 | 63 |
| XI | 10.18 | B | 0.410 | 0.717 | 0.374 | 1.102 | 40 | 44 | 45 |

| Example number | Space velocity, gm./hr. cc. With filtrate recycle using 3 reactors | Without filtrate recycle using 2 reactors | $PO_4$ conversion (based on filter cake analysis) | Wt. percent of $SO_4$ in filtrate product | Wt. percent of K recovered in filtrate product | Overall wt. loss (percent) | Wt. percent H ion in filtrate |
|---|---|---|---|---|---|---|---|
| I | 0.249 | 0.178 | 94.0 | 4.94 | 93.6 | 6.2 | 0.0896 |
| II | 0.247 | 0.180 | 94.4 | 5.13 | 94.4 | 4.80 | 0.0888 |
| III | 0.227 | 0.182 | 97.8 | 5.15 | 93.6 | 3.13 | 0.0904 |
| IV | 0.249 | 0.175 | 91.9 | 5.20 | 92.1 | 8.88 | 0.0968 |
| V | 0.205 | 0.180 | 94.2 | 5.26 | 92.7 | 6.42 | 0.096 |
| VI[2] | 0.221 | 0.183 | 88.7 | 4.81 | 91.9 | 6.59 | 0.0784 |
| VII | 0.205 | 0.176 | 97.1 | 5.38 | 97.1 | 6.04 | 0.0928 |
| VIII | 0.198 | 0.170 | 92.9 | 3.96 | 88.8 | 6.46 | 0.0728 |
| IX[3] | 0.176 | 0.142 | 96.3 | 5.13 | 66.0 | 9.62 | 0.169 |
| X | 0.197 | 0.162 | 92.3 | 4.35 | 93.7 | 4.13 | 0.0770 |
| XI | 0.200 | 0.175 | 97.0 | 3.86 | 91.4 | 5.78 | 0.084 |

[1]Rocks-(A) Size 60% through 200 mesh-analysis, Ca 34.54 wt. percent, $PO_4$, 43.07 wt. percent. (B) Size, 60% through 200 mesh-analysis, Ca 34.79 wt. percent, $PO_4$, 43.24 wt. percent. (C) Size, 80–90% through 200 mesh-analysis, Ca 33.21 wt. percent, $PO_3$, 43.48 wt. percent.

[2]$H_2SO_4$ fed into Reactor #I instesd of #II for this run.

[3]Wt. percent ions in Filtrate was 20–22, except for Run IX which was about 27 wt. percent.

TABLE II

-continued

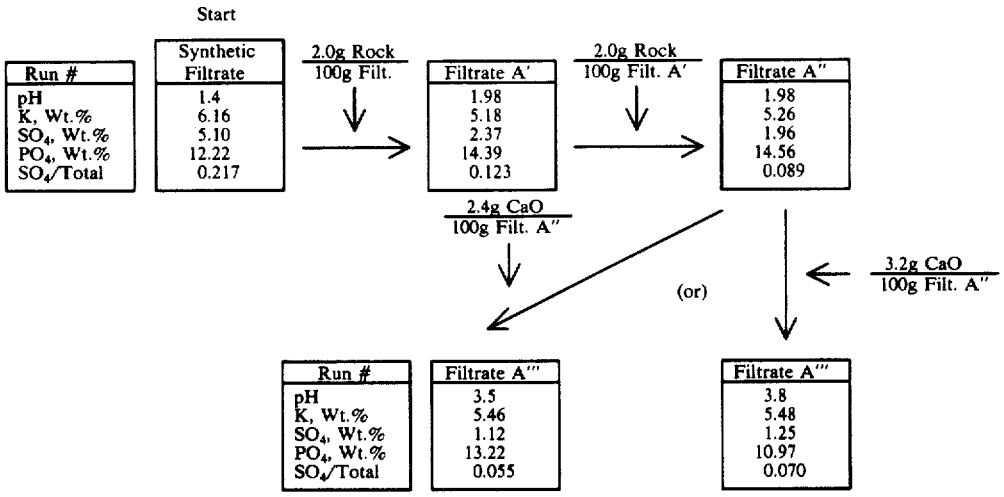

ions of 0.055 to 0.07 and a weight ratio of $K^+/PO_4^=$ of 0.413 to 0.499. These runs therefore illustrate how successive treatments with phosphate rock and calcium oxide will substantially reduce the $SO_4^=$ content while substantially raising the pH of the mixture.

To further illustrate this aspect, two successive continuous filtrate treatment runs were made using a synthetic filtrate (analysis below) and phosphate rock. The resulting Filtrate A''' from the second run was continuously treated with CaO. For each run three vessels were used. Table III contains the conditions and results for these runs.

Analysis of the synthetic filtrate was:

| | | |
|---|---|---|
| $K^+$ | weight (percent) | 6.16 |
| $SO_4^=$ | " | 5.10 |
| $PO_4^=$ | " | 12.22 |
| pH | | 1.4 |
| Wt. ratio $K^+/PO_4^=$ | | 0.504 |
| Wt. ratio $SO_4^=$/total | | 0.217 |

This filtrate was subjected to continuous processing as outlined above with each successively recovered filtrate being labeled Filtrate A', Filtrate A" and Filtrate

TABLE III

| | Run 1 | Run 2 | Run 3 |
|---|---|---|---|
| Conditions | First rock treatment | Second rock treatment | CaO treatment |
| Gms. additive per 100 gms. filtrate | 2.0 | 2.0 | 2.4 |
| Filt. feed rate (cc./min.) | 50.25 | 50.47 | 50.24 |
| Solid feed rate (g./min.) | 1.22 | 1.19 | 1.42 |
| Temp. vessels 1/2/3 (° C.) | 60/60/90 | 60/60/90 | 60/60/90 |
| Residence time of vessels 1/2/3 (hrs.) | 1.3/2.1/3.5 | 1.3/2.1/3.5 | 1.3/2.1/3.5 |
| Results | Filtrate A' | Filtrate A" | Filtrate A''' (product) |
| 1. $SO_4$ reduction (wt. percent) | 30.9 | 17.4 | 53.9 |
| 2. $PO_4$ conv. of rock (wt. percent) | 85.6 | 67.8 | — |
| 3. Wt. K/wt. $PO_4$ of filtrate | 0.411 | 0.372 | 0.414 |
| 4. Wt. $SO_4$/wt. total of filtrate | 0.151 | 0.113 | 0.06 |
| 5. Wt. percent of K recovered in filtrate | 99.3 | 100.4 | 106.0 |
| 6. Wt. percent of $SO_4$ recovered in filtrate | 69.1 | 82.6 | 46.0 |
| 7. Wt. percent of $PO_4$ recovered in filtrate | 99.0 | 98.1 | 85.9 |
| 8. pH of filtrate | 1.75 | 2.00 | 3.55 |

TABLE IV

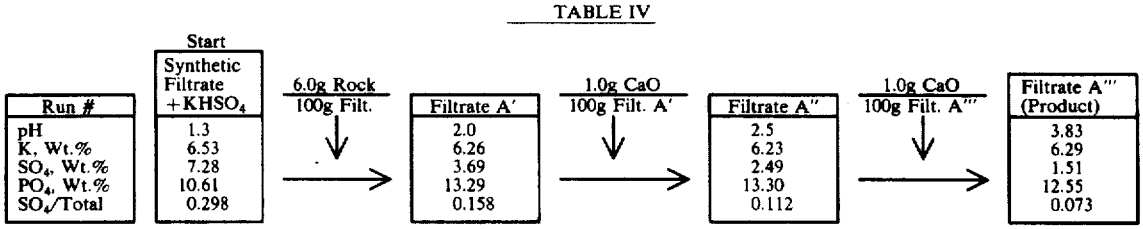

-continued

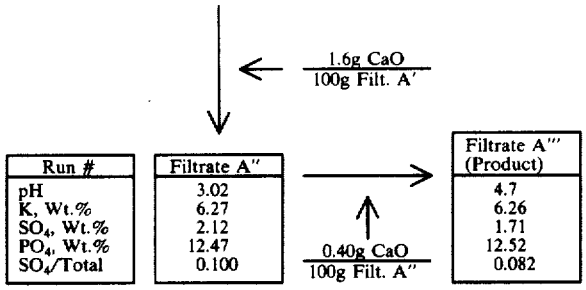

A''', the latter of course being the filtrate from which the final product is recovered.

From the Table III, it will be observed that Filtrate A''' of Run 3 has the most desirable characteristics, i.e. a pH of 3.55, percent of $SO_4^=$ (on a dry solid basis) of 6%, and a weight ratio of $K^+/PO_4^=$ of 0.414. Actually in Run 3, the $K^+/PO_4^=$ ratio could have been increased by increasing the amount of calcium oxide added. Of course, the more CaO that is added, the more $CaHPO_4$ that will be precipitated which would have to be recycled to the acidulation reactor. Obviously therefore, the $K^+/PO_4^=$ ratio can also be adjusted by the amount of CaO added.

Below, in Table IV are block diagrams of results from various batch runs, using phosphate rock and CaO. For these runs the temperature and residence time were 60° C. and 6 hours, respectively. In operation, the synthetic filtrate and the solid additive were put into the vessels initially. Then a 30% aqueous $KHSO_4$ solution was fed into the vessel over a period of 3 hours to minimize double salt formation. As previously explained, the addition of more CaO in either scheme would have resulted in a higher $K^+/PO_4^=$ weight ratio.

From Table IV, it will be observed that the product (Filtrate A''') provides desirable characteristics as the pH if above 3.0, the $SO_4^=$ content is below 2.0, and the $K^+/PO_4^=$ ratio is above 0.40. Therefore, these runs illustrate preferred procedures for conducting the reaction.

The invention has been illustrated herein by reference to certain preferred embodiments. However, it is to be understood that the invention is not to be limited thereto as obvious variations thereon will become apparent to those skilled in the art.

What is claimed is:

[1. A process for the preparation of potassium dihydrogen phosphate which comprises:

(1) contacting phosphate rock or a solubilized form thereof with a sufficient excess of sulfuric acid to drive the reaction to completion at a temperature of about 40° to 90° C;

(2) adding thereto a 10–50% aqueous solution of potassium hydrogen sulfate in sufficient amount to form a reaction mixture containing ions of potassium dihydrogen phosphate and at a rate so as to minimize the formulation of insoluble salts of $KHSO_4$ and $CaSO_4$ and under such conditions that the concentration of dissolved solids in the reaction mixture does not exceed about 60%;

(3) maintaining the reaction mixture under these conditions for formation of an easily filterable calcium sulfate precipitate;

(4) removing the solid calcium sulfate from the reaction mixture to provide a filtrate; and (5) recovering the gold potassium dihydrogen phosphate from the filtrates and provide a phosphoric acid mother liquor.]

[2. A process according to claim 1 wherein the potassium hydrogen sulfate solution is prepared by the reaction of potassium chloride and sulfuric acid at a temperature of about 250°–300° C., the hydrogen chloride is removed and the resulting potassium hydrogen sulfate is dissolved in water to form an aqueous solution of about 10–50%.]

[3. A process according to claim 2 wherein the sulfuric acid has a concentration of about 60 to 98% and is employed to provide an excess of about 5 to 10 weight percent excess sulfate ion in the reacting mixture.]

[4. A process according to claim 2 wherein the potassium hydrogen sulfate solution contains about 4% $H_2SO_4$ and about 42% $KHSO_4$.]

[5. A process according to claim 1 wherein the filtrate, from step (4), after removal of the calcium sulfate, is treated with a calcium-bearing material selected from the group consisting of phosphate rock, tricalcium phosphate, dicalcium phosphate, calcium phosphate, calcium oxide and mixtures thereof, alternatively or successively, at a temperature of 40°–90° C., to precipitate additional sulfate ion and partially neutralize the mixture, and removing the solids to provide a lower-sulfate filtrate containing the potassium dihydrogen phosphate.]

[6. A process according to claim 1 wherein the filtrate from step (4), after removal of calcium sulfate, is concentrated and then cooled to precipitate the potassium dihydrogen phosphate.]

[7. A process according to claim 1 wherein the product is recovered by adding a water-miscible organic solvent to the filtrate from step (4), allowing the solid potassium dihydrogen phosphate to precipitate and separating the solid product.]

[8. A process according to claim 7 wherein the organic solvent is a lower alkyl alcohol, a lower alkyl ketone or mixture thereof.]

9. A process for the precipitation of potassium dihydrogen phoshate which comprises:

(1) contacting phosphate rock or a solubilized form thereof with a sufficient excess of sulfuric acid to drive the reaction to completion at a temperature of about 40° to 90° C. in a main reactor;

(2) reacting potassium chloride and sulfuric acid in a separate reactor at a temperature of 250° to 300° C. with removal of the dry hydrogen chloride evolved and dissolving the resulting potassium hydrogen sulfate with water to form a 10–50% aqueous solution;

(3) adding said 10–50% aqueous solution of potassium hydrogen sulfate to said main reactor in sufficient amount to form a reaction mixture containing ions of potassium dihydrogen phosphate and at a rate so as to minimize the formation of insoluble salts of $KHSO_4$ and $CaSO_4$ and under such conditions that the concentration of dissolved solids in the reaction mixture does not exceed about 60%;

(4) maintaining the reaction mixture under these conditions for formation of an easily filterable solid, calcium sulfate precipitate;

(5) removing the solid calcium sulfate from the reaction mixture to provide a filtrate;

(6) contacting said filtrate with a calcium-bearing material selected from the group consisting of phosphate rock, tricalcium phosphate, dicalcium phosphate, calcium oxide and mixtures thereof, alternatively or successively, at a temperature of 40°-90° C. to precipitate additional sulfate ion and partially neutralize the mixture and removing the precipitated solids to provide a filtrate lower in sulfate ion and containing potassium dihydrogen phosphate:

(7) recovering the solid potassium dihydrogen phosphate from the filtrate to provide a phosphoric acid mother liquor; and (8) recycling the mother liquor to the main reactor.

10. A process according to claim 9 wherein the filtrate from step (6), after removal of the solids, is concentrated and then cooled to precipitate the potassium dihydrogen phosphate.

11. A process according to claim 9 wherein the filtrate from step (6), after removal of the solids is mixed with a water-miscible organic solvent, the solid potassium dihydrogen phosphate is allowed to precipitate and then the solid product is recovered by filtration.

12. A process for the preparation of potassium dihydrogen phosphate which comprises:

(1) contacting phosphate rock or a solubilized form thereof with a sufficient excess of sulfuric acid to drive the reaction to completion at a temperature of about 40° to 90° C. in a main reactor;

(2) adding thereto a 10–50% aqueous solution of potassium hydrogen sulfate in sufficient amount to form a reaction mixture containing ions of potassium dihydrogen phosphate and at a rate so as to minimize the formation of insoluble salts of $KHSO_4$ and $CaSO_4$ and under such conditions that the concentration of dissolved solids in the reaction mixture does not exceed about 60%;

(3) maintaining the reaction mixture under these conditions for formation of an easily filterable, solid, calcium sulfate precipitate;

(4) removing the solid calcium sulfate from the reaction mixture to provide a filtrate;

(5) contacting said filtrate with a calcium-bearing material selected from the group consisting of phosphate rock, tricalcium phosphate, dicalcium phosphate, calcium phosphate, calcium oxide and mixtures thereof, alternatively or successively, and removing the precipitated solids to provide a resultant solution lower in sulfate ion content;

(6) concentrating said resultant solution and cooling to crystallize the solid potassium dihydrogen phosphate;

(7) removing the solid potassium dihydrogen phosphate to provide a phosphoric acid mother liquor; and (8) recycling the mother liquor to the main reactor.

13. A process for the preparation of potassium dihydrogen phosphate which comprises:

(1) contacting phosphate rock or a solubilized form thereof with a sufficient excess of sulfuric acid to drive the reaction to completion at a temperature of about 40° to 90° C. in a main reactor;

(2) adding thereto a 10–50% aqueous solution of potassium hydrogen sulfate in sufficient amount to form a reaction mixture containing ions of potassium hydrogen phosphate and at a rate so as to minimize the formation of insoluble salts of $KHSO_4$ and $CaSO_4$ and under such conditions that the concentration of dissolved solids in the reaction mixture does not exceed about 60%;

(3) maintaining the reaction mixture under these conditions for formation of an easily filterable, solid, calcium sulfate precipitate;

(4) removing the solid calcium sulfate from the reaction mixture to provide a filtrate;

(5) contacting said filtrate with a calcium-bearing material selected from the group consisting of phosphate rock, tricalcium phosphate, dicalcium phosphate, calcium phosphate, calcium oxide and mixtures thereof, alternatively or successively, and removing the precipitate solids to provide a resultant solution lowered in sulfate ion;

(6) contacting said resultant solution with a substantial equal volume of a water-miscible organic solvent, allowing the potassium dihydrogen phosophate to precipitate and form solid potassium dihydrogen phosphate;

(7) removing the solid potassium dihydrogen phosphate to provide a phosphoric acid mother liquor;

(8) removing the organic solvent; and (9) recycling the phosphoric acid mother liquor to the main reactor.

[14. A continuous process for the preparation and recovery of potassium dihydrogen phosphate from the reaction of phosphate rock or more solubilized form thereof, sulfuric acid and potassium hydrogen sulfate, the improved steps which comprise:

(1) contacting phosphate rock or more solubilized form thereof with a sufficient excess of sulfuric acid to drive the reaction to completion to form a reacting slurry at a temperature of about 40° to 90° C. in a main reactor comprising a series of reactors with continuous recycle of a portion of the reacting slurry from the last reactors to the first or intermediate reactors;

(2) adding thereto a 10–50% aqueous solution of potassium hydrogen sulfate in sufficient amount to form a reaction mixture containing ion of potassium hydrogen phosphate and at a rate so as to minimize the formation of insoluble salts of $KHSO_4$ and $CaSO_4$ and under such conditions that the concentration of dissolved solids in the reaction mixture does not exceed about 60%;

(3) maintaining the reaction mixture under these conditions for formation of an easily filterable, solid, calcium sulfate precipitate;

(4) continuously removing a portion of the reacting slurry;

(5) separating the solid calcium sulfate from the reacting slurry to provide a solid calcium sulfate cake and a filtrate;

(6) washing the solid calcium sulfate cake with water and recycling the wash water to the main reactor;

(7) recovering the solid potassium dihydrogen phosphate from the filtrate to provide a phosphoric acid mother liquor; and (8) recycling the mother liquor to the main reaction.]

[15. A continuous process according to claim 14 wherein the filtrate from step (5), after removal of the solid calcium sulfate cake, is contacted with a calcium-bearing material selected from the group consisting of phosphate rock, tricalcium phosphate, dicalcium phosphate, calcium oxide and mixtures thereof, alternatively or successively, at a temperature of 40° to 90° C. to precipitate additional sulfate ion and partially neutralize the mixture and removing the precipitated solids to provide a low-sulfate filtrate containing potassium dihydrogen phosphate, recovering the solid potassium dihydrogen phosphate from the low-sulfate filtrate to provide a phosphoric acid mother liquor, and recycling the mother liquor to the main reactor.]

[16. A process according to claim 14 wherein the low-sulfate filtrate containing the potassium dihydrogen phosphate is mixed with a substantially equal volume of a water-miscible organic solvent, the solid potassium dihydrogen phosphate is allowed to precipitate and is separated from a phosphoric acid mother liquor, the organic solvent is recovered from the mother liquor and cycled to storage for reuse in precipitating additional potassium dihydrogen phosphate, and the phosphoric acid mother liquor is recycled to the main reactor.]

[17. A process according to claim 15 wherein calcium oxide is added to the phosphoric acid aqueous solution from step (5) in sufficient amount to raise the pH of the solution and form potassium monohydrogen phosphate.]

*18. In a process for the preparation of potassium dihydrogen phosphate by the reaction of phosphate rock or a solubilized form thereof with a reaction medium containing sulfuric acid and potassium hydrogen sulfate at a temperature of about 40° to 90° C., removing solid calcium sulfate from the resulting reaction mixture to provide a solution of potassium dihydrogen phosphate in phosphoric acid, and recovering solid potassium dihydrogen phosphate from the phosphoric acid solution, the improved steps comprising:*

*(1) forming said reacting medium by initially forming a mixture of phosphate rock or a solubilized form and an excess of sulfuric acid;*

*(2) adding thereto a 10–50% aqueous solution of potassium hydrogen sulfate in sufficient amount to form a reaction mixture containing ions of potassium dihydrogen phosphate and at a rate so as to minimize the formation of insoluble salts of $KHSO_4$ and $CaSO_4$ and under such conditions that the concentration of dissolved solids in the reaction mixture does not exceed about 60%; and*

*(3) maintaining the reaction mixture under these conditions for formation of an easily filterable calcium sulfate precipitate.*

*19. A process according to claim 18 wherein the potassium hydrogen sulfate solution is prepared by the reaction of potassium chloride and sulfuric acid at a temperature of about 250°–300° C., the hydrogen chloride is removed and the resulting potassium hydrogen sulfate is dissolved in water to form an aqueous solution of about 10–50%.*

*20. A process according to claim 19 wherein the sulfuric acid has a concentration of about 60 to 98% and is employed to provide an excess of about 5 to 10 weight percent excess sulfate ion in the reacting mixture.*

*21. A process according to claim 19 wherein the potassium hydrogen sulfate solution contains about 4% $H_2SO_4$ and about 42% $KHSO_4$.*

*22. A process according to claim 20 wherein the phosphoric acid filtrate containing potassium dihydrogen phosphate, after removal of the calcium sulfate, is treated with a calcium-bearing material selected from the group consisting of phosphate rock, tricalcium phosphate, dicalcium phosphate, calcium phosphate, calcium oxide and mixtures thereof, alternatively or successively, at a temperature of 40°–90° C., to precipitate additional sulfate ion and partially neutralize the mixture, and removing the solids to provide a lower sulfate filtrate containing the potassium dihydrogen phosphate.*

*23. A process according to claim 18 wherein after removal of calcium sulfate from the filtrate, it is concentrated and then cooled to precipitate solid potassium dihydrogen phosphate.*

* * * * *